United States Patent
Takeuchi

(10) Patent No.: US 7,184,376 B2
(45) Date of Patent: Feb. 27, 2007

(54) REPRODUCING APPARATUS

(75) Inventor: Kengo Takeuchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 611 days.

(21) Appl. No.: 10/781,740

(22) Filed: Feb. 20, 2004

(65) Prior Publication Data
US 2004/0170400 A1    Sep. 2, 2004

(30) Foreign Application Priority Data
Feb. 28, 2003    (JP)    ............... 2003-052557

(51) Int. Cl.
G11B 5/09    (2006.01)
(52) U.S. Cl. ............... 369/47.11; 369/47.15; 369/47.55; 369/53.45; 369/59.14
(58) Field of Classification Search ............ None
See application file for complete search history.

(56) References Cited

U.S. PATENT DOCUMENTS 5,838,967 A * 11/1998 Okayama et al. ......... 707/200

FOREIGN PATENT DOCUMENTS

JP    2002-25235    1/2002

* cited by examiner

Primary Examiner—Muhammad Edun
(74) Attorney, Agent, or Firm—Fitzpatrick, Cella, Harper & Scinto

(57) ABSTRACT

A reproducing apparatus for detecting a reproduction stop date when reproduction of image data is stopped in the past, and for determining a reproduction start position in the image data on a basis of the reproduction stop date, and further for starting the reproduction of the image data from the determined reproduction start position in response to an instruction of starting reproduction.

27 Claims, 5 Drawing Sheets

FIG. 3

| | |
|---|---|
| DISK ID | 001 |
| CONTENTS ID | 224278 (CONTENTS A) |
| DATE AND TIME OF PREVIOUS STOP | 2002 / 07 / 01 20:15 |
| STOP ADDRESS | 150543 |
| TOTAL NUMBER OF FRAMES | 625530 |
| ENCODING METHOD | MPEG4 |

REPRODUCING APPARATUS

BACKGROUND OF THE INVENTION

1. Field of the Invention

The present invention relates to a reproducing apparatus including a resume function to be used for starting to reproduce image data again after stopping the reproduction of the image data temporarily.

2. Related Background Art

Currently is known an apparatus for recording and reproducing digital data such as dynamic image data on and from various recording media such as an optical disk, for example a digital versatile disk (DVD), a magnetic disk, for example a hard disk, or a magnetic tape.

Such the apparatus using a magnetic tape starts reproduction again from the last reproduction stop position when the reproduction is started again after intermittence of the reproduction.

On the other hand, such the apparatus using a disk medium generally resets a read position on the disk every reproduction stop.

Accordingly, an apparatus having a resume function for starting reproduction again from the last stop position similarly to the apparatus using a tape medium, by storing the position information at the time of stopping reproduction in a memory or the like built in the apparatus, has begun to appear.

Moreover, a plurality of methods for recording dynamic image data on a recording medium has been examined. Any of the methods performs resume reproduction.

Moreover, Japanese Patent Application Laid-Open No. 2002-25235 discloses a technique for performing digest reproduction of a scene preceding a reproduction stop position.

However, for a user, two points are anxious when the user reproduces a dynamic image of the same contents from the last reproduction stop position.

One of them is whether or not there is a scene which the user has missed to see, even for several seconds, despite using the resume function. The other of them is whether or not the user can immediately remind the scene which has been already reproduced.

When the reproduction of a dynamic image is stopped halfway, a user generally performs some actions to find a remote controller and operate a stop button. Such actions frequently cause the missing of some scenes for several seconds. Furthermore, even if a part succeeding contents which has been seen in the past is reproduced, the seen contents is gradually forgotten as the last seeing becomes away.

As described above, the resume function for starting reproduction simply from the last reproduction stop position cannot deal with such problems.

SUMMARY OF THE INVENTION

The present invention aims to solve such problems.

Another object of the present invention is to provide a resume reproduction function which is more comfortable for a user.

For solving the problems described above to achieve the above-mentioned objects, according to an aspect of the present invention, a reproducing apparatus of the present invention includes: reproducing means for reproducing image data from a recording medium; determining means for detecting a reproduction stop date when reproduction of the image data has been stopped in the past and determining a reproduction start position in the image data on a basis of the reproduction stop date; and control means for controlling the reproducing means so as to start the reproduction of the image data from the reproduction start position determined by the determining means in response to an instruction of starting reproduction.

The other objects and features of the present invention will be clearer by the following detailed description of the preferred embodiment of the present invention with reference to the attached drawings.

BRIEF DESCRIPTION OF THE DRAWINGS

FIG. 3 is a table showing a situation of resume data;

DESCRIPTION OF THE PREFERRED EMBODIMENTS

In the following, the attached drawings are referred to while a preferred embodiment of the present invention is described in detail.

First, the embodiment of the present invention will be described conceptually.

Figure 1:
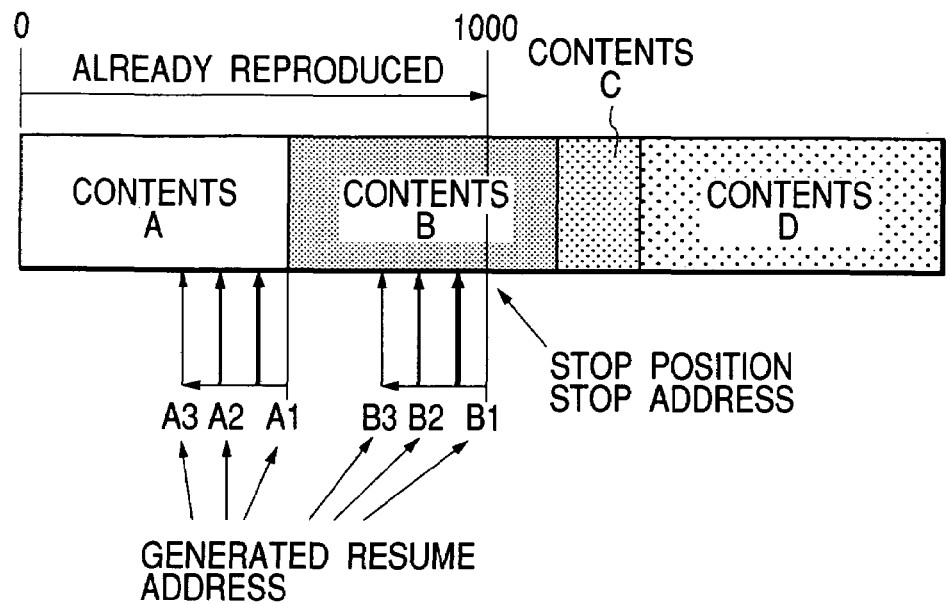
FIG. 1 is a view showing a determination operation of a resume position by an embodiment of the present invention.

FIG. 1 is a view showing the situation of contents A–D of dynamic image data recorded on a disk-like recording media in the present embodiment.

Incidentally, FIG. 1 shows the dynamic image data recorded on the disk in the order of reproduction. The image data of the contents A–D shown in FIG. 1 is not always recorded continuously on a track formed on the disk in the order of FIG. 1, and the data may be separately recorded in discrete areas on the disk.

FIG. 1 shows a situation in which the dynamic image data recorded on the disk medium has been reproduced from the address 0 of the contents A to the address 1000 of the contents B and subsequently the reproduction has been stopped.

At this time, a resume address of the contents A is set at a position A1 preceding the end address of the contents A by several seconds. In the present embodiment, as time elapses before the next reproduction, the position of the resume address is changed to positions A2, A3 and so forth, each preceding the previous position thereof by a predetermined time period. Moreover, when the time has elapsed by a predetermined time period or more before the next reproduction, the resume position is returned to the head position of the contents A, and resume data, which will be described later, is initialized, or deleted, as a matter of fact.

As to the contents B also, a resume address B1 is similarly set at a position preceding the stop address by several seconds. As time elapses before the next reproduction, the position of the resume address is changed to positions B2, B3 and so forth, each preceding the previous position thereof by the predetermined time period of time.

That is, when a reproducing apparatus according to the present invention receives an instruction of resume reproduction, the apparatus changes a resume address from the position B1 to the positions B2, B3 and so forth in order as time elapses from the time of the last reproduction stop. Moreover, the apparatus can perform skip reproduction starting from the position B1 during resume reproduction from the position B3 in response to an operation of a user. Moreover, it is also possible to perform stepwise skip reproduction by dividing the interval between the positions B3 and B1 into a plurality of parts.

Figure 2:
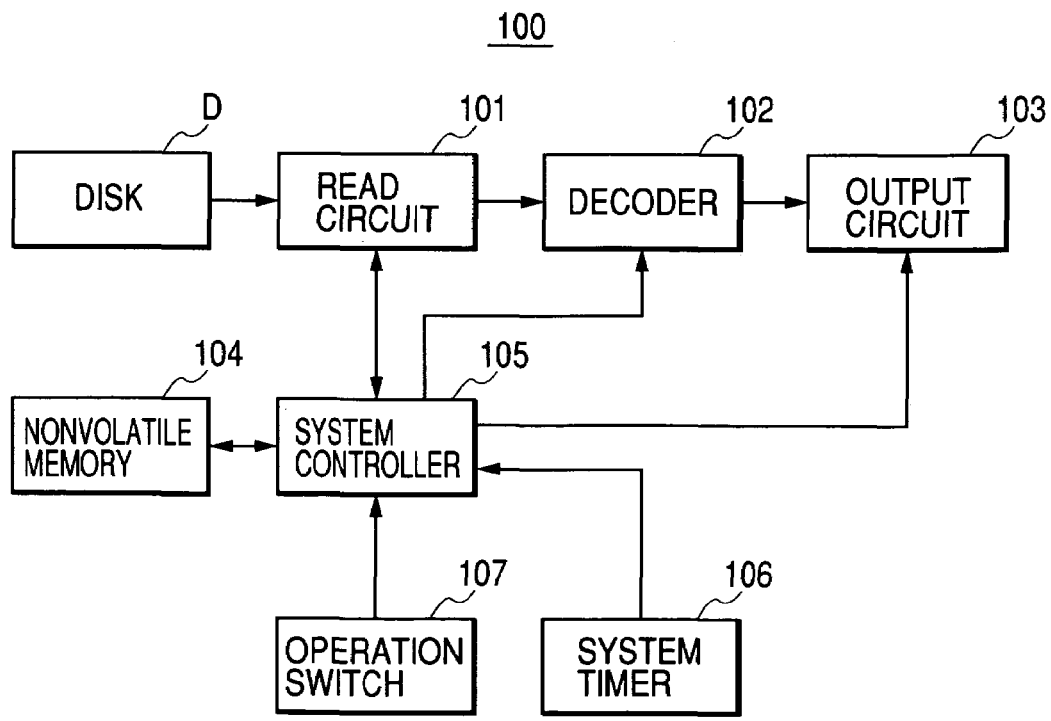
FIG. 2 is a block diagram showing a configuration of a reproducing apparatus of the embodiment of the present invention.

Next, FIG. 2 will be referred to while a reproducing apparatus of the embodiment of the present invention is described. FIG. 2 is a block diagram showing a configuration of the reproducing apparatus 100 to which the present invention is applied.

The reproducing apparatus 100 of FIG. 2 is an apparatus for reproducing dynamic image data recorded on a disk D capable of being mounted on or ejected from the apparatus 100 easily by means of a mounting/ejecting mechanism (not shown). The reproducing apparatus 100 is composed of a read circuit 101 for reading the dynamic image data from the disk D; a decoder 102 for decoding the dynamic image data read by the read circuit 101 in conformity with the encoding method of the dynamic image data to convert the dynamic image data into a video signal of National Television Standards Code (NTSC) or the like; an output circuit 103 for outputting the video signal obtained by the decoder 102, data of various display screens, or the like to an external monitor; a nonvolatile memory 104 for holding information, even when electric power is made to be off, so that the memory can record address data and the like; a system controller 105 for controlling the operation of each unit of the apparatus 100; a timer 106, or a real time clock, for timing correct times by means of a quartz resonator or the like; and an operation switch 107, such as a reproduce button and a stop button, which a user can operate.

The system controller 105 is composed of a microprocessor, a working memory, a read only memory (ROM) for storing programs, and the like. The system controller 105 performs fundamental operations such as a calculation of a resume address, the control of the operation switch 107, and the like.

Now, an example of the resume data to be stored in the nonvolatile memory 104 is shown in FIG. 3.

In the present embodiment, information such as disk identification data (ID) for discriminating an exchangeable disk D, discrimination ID for discriminating a contents recorded on the disk D, the date and the time when reproduction is stopped, and a stop address is recorded in the nonvolatile memory 104 as resume data every contents. Moreover, in the present embodiment, the compression method of a dynamic image and the total number of frames of a contents are recorded for calculation processing of resume addresses. Thereby, it becomes possible to express a relation between a time going back to a resume address from a stop address and an actual resume address position by means of the number of frames.

Figure 4:
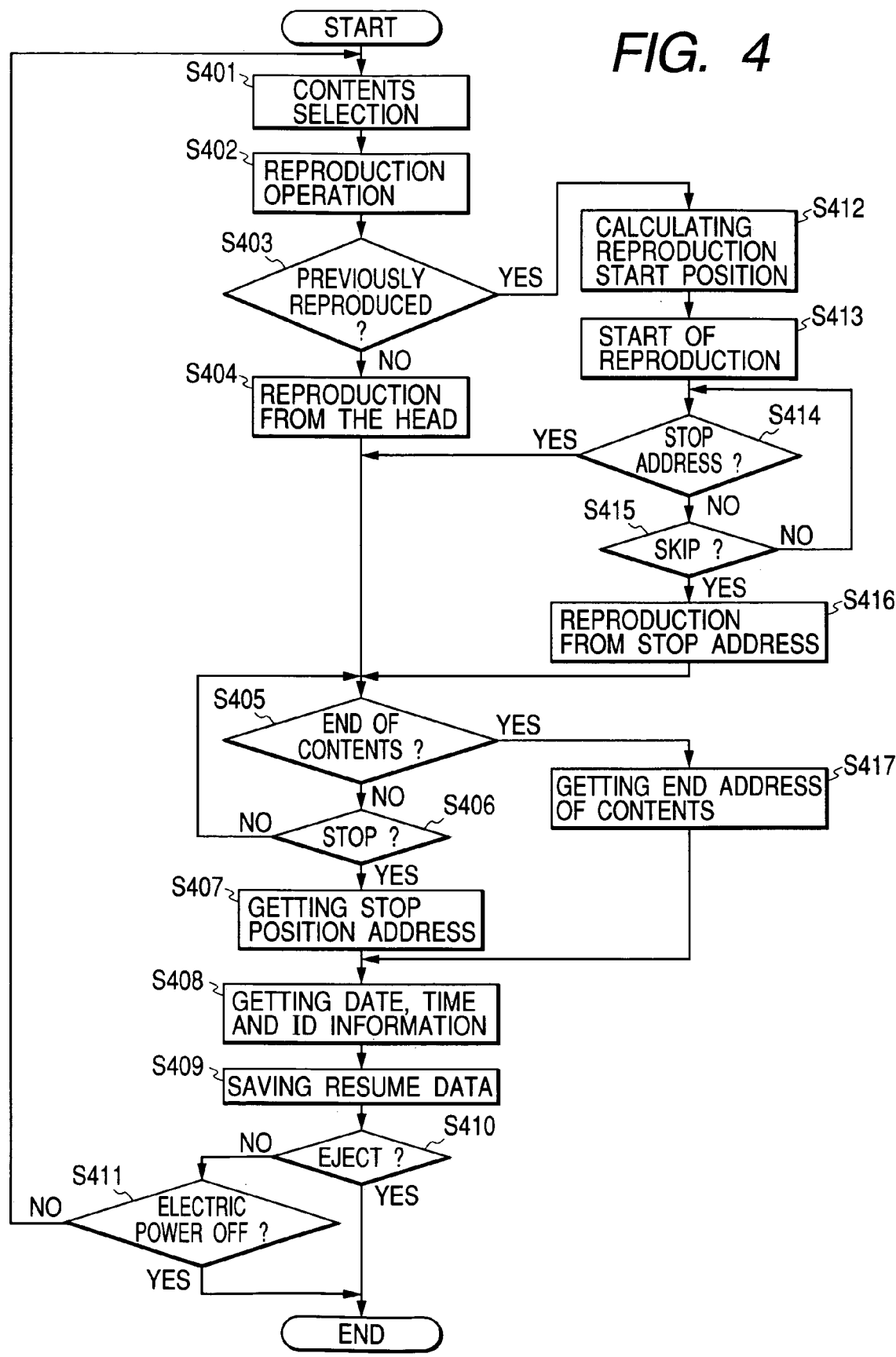
FIG. 4 is a flowchart showing a reproducing operation of the embodiment of the present invention.

Next, FIG. 4 is referred to explain a control operation of the reproducing apparatus by the system controller 105 of the embodiment of the present invention.

The operation flow starts when a power supply is turned on by an operation of the operation switch 107, or when a new disk D is mounted on the reproducing apparatus 100.

The system controller 105 detects the information of each contents of the image data recorded on the disk D with the read circuit 101. Then, the system controller 105 outputs the data of the list of the contents recorded on the disk D from the output circuit 103, and waits a selection of a contents by a user.

After the user selects the contents to be reproduced (Step S401) and a reproduction operation is performed (Step S402), the system controller 105 detects whether the resume data of the selected contents is recorded in the nonvolatile memory 104 or not, and judges whether the selected contents is one which has been reproduced previously or one which is to be reproduced for the first time (Step S403).

In case that the resume data of the selected contents is not recorded in the nonvolatile memory 104 and the contents is to be reproduced for the first time, the system controller 105 controls the read circuit 101 to read the dynamic image data of the selected contents from the head address of the contents, and the read data is decoded by the decoder 102 and then output from the output circuit 103 (Step S404).

After the starting of the reproduction, when the system controller 105 determines to stop the reproduction of the selected contents after the completion of the selected contents, or to start the reproduction of another contents successively (Step S405), the system controller 105 obtains the recording address of the last data of the reproduced contents (Step S417), and obtains the time of the completion of the reproduction and the discrimination ID of the contents (Step S408). Then, the system controller 105 records the obtained data in the nonvolatile memory 104 in a lump as resume data (Step S409).

On the other hand, when the user performs a stop operation with the operation switch 107 before the completion of the reproduction of the contents (Step S406), the system controller 105 obtains the address data of the image data read from the read circuit 101 immediately after the stop as stop address data (Step S407), and obtains the time information of the stop and the discrimination ID of the contents (Step S408). Then, the system controller 105 records the obtained data in the nonvolatile memory 104 in a lump as resume data (Step S409).

After that, when an eject instruction (Step S410) or an instruction of turning off electric power (Step S411) is input, the system controller 105 terminates the processing.

Moreover, when resume data is stored in the nonvolatile memory 104 at Step S403, the system controller 105 starts to calculate a resume address from which resume reproduction is to be started, on the basis of the present date obtained from the timer 106 and the stop date stored in the nonvolatile memory 104 (Step S412).

That is, at Step S412, the system controller 105 compares the present time obtained from the timer 106 with the stop date of the resume data stored in the nonvolatile memory 104, and the system controller 105 calculates the resume address so as to return the reproduction start position (resume position) to the past according to the time difference. The calculation of the resume address is performed on a unit time basis, for example, by counting the number of frames. For example, the resume address is set at the position preceding the last stop position by five seconds when the last stop date is one hour ago, at the position preceding the last stop position by fifteen seconds when the last stop date is one day ago, or at the position preceding the last stop position by thirty seconds when the last stop date is two days ago.

Next, the system controller 105 transmits the calculated resume address to the read circuit 101, and starts to reproduce the dynamic image data from the resume address (Step S413).

After that, the user can perform skip reproduction to the last stop position by performing a predetermined operation such as double depressions of the reproduce button before the reproduced image reaches the position where the reproduction has stopped at the last time (Step S414, Step S415 and Step S416). Moreover, when the reproduction reaches the reproduction stop position without any skip operations, the system controller 105 continues the normal reproduction operation (Step S414) continuously.

As described above, according to the present embodiment, the date and time information of a reproduction stop is stored in a memory together with reproduction stop position information, and a resume address is changed toward the head of a contents according to the time elapsing before the next reproduction start time. Consequently, the more a contents is lost from the user's memory owing to a long time elapsing from the last reproduction of the contents, the more the resume reproduction start position can precede the last reproduction stop position.

Consequently, the more preceding start position aids the user to remember a scene easy to be forgotten, and thereby a resume function more comfortable for the user can be realized.

Figure 5:
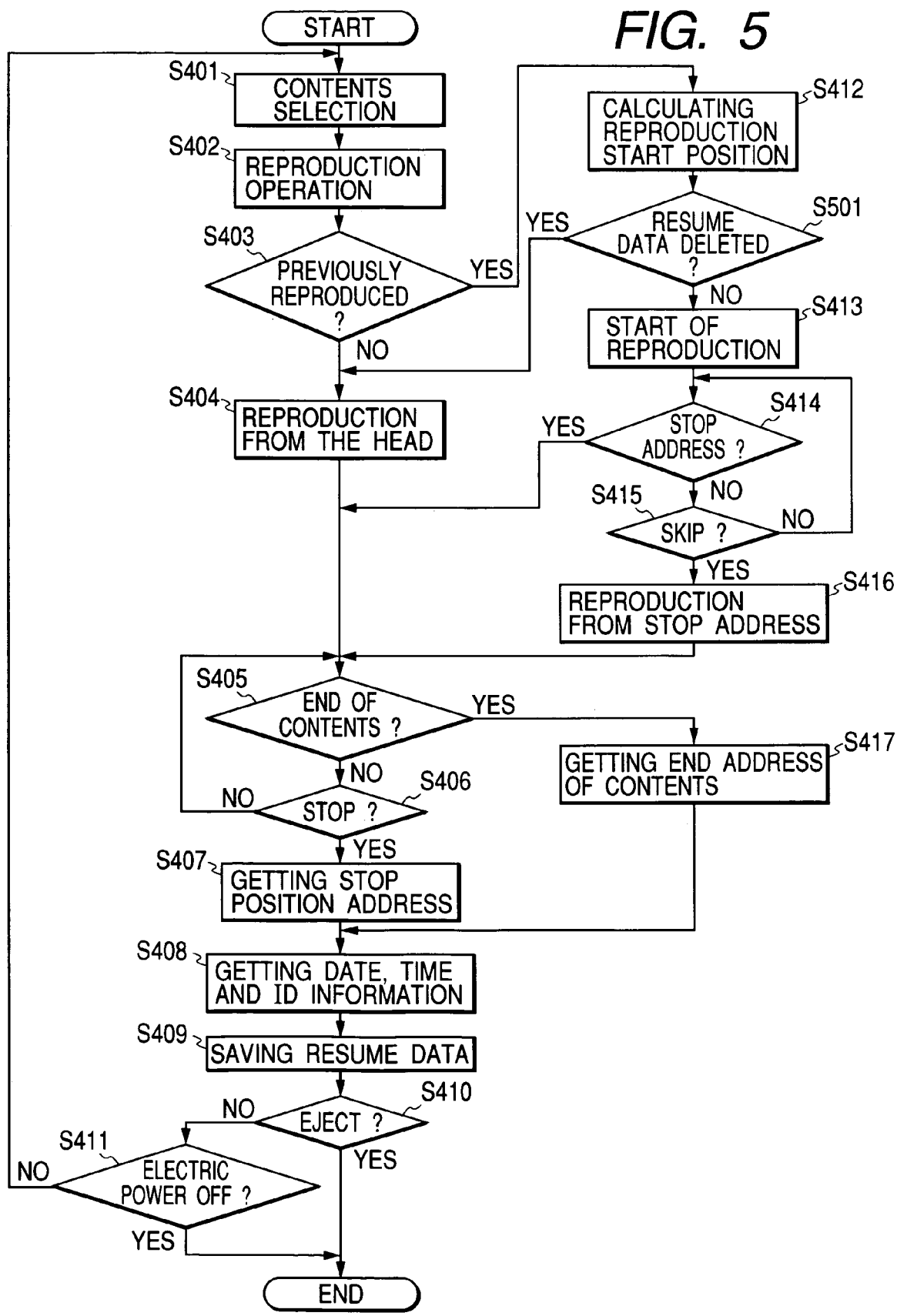
FIG. 5 is a flowchart showing another reproducing operation of the embodiment of the present invention.

Next, the flowchart shown in FIG. 5 will be referred to while another operation of the embodiment of the present invention is described. In the operation of FIG. 5, in the case where the date of resume reproduction has elapsed from the date of the last reproduction stop by more than a predetermined time period, the resume data of the contents is deleted from the nonvolatile memory 104.

In the flowchart of FIG. 5, the process of Step S501 is inserted between the processes of Step S412 and Step S413 in the flowchart of FIG. 4. Accordingly, only the difference from the processing of FIG. 4 will be described in the following.

At Step S412 in FIG. 5, the system controller 105 calculates a resume address from which resume reproduction is to be started, on the basis of two information of the present date obtained from the timer 106 and the date of the last reproduction stop which is stored in the nonvolatile memory 104 similarly to the processing of FIG. 4. However, in the flow of FIG. 5, in the case where the present date has elapsed from the date of the last reproduction stop by more than the predetermined time period, it is set to delete the resume address.

Then, at Step S501, the system controller 105 judges whether the resume data has been deleted or not. When the resume data has been deleted, the processing moves to Steps S404, and reproduction is started from the head address of the contents.

When the resume data has not been deleted, the processing moves to Step S413, and reproduction is started from the calculated resume address. When the resume data is judged to be deleted or not, the present time is compared with the stored date information of the resume data, and whether the time difference is equal to or more than a predetermined time period or not is judged. Thereby, it becomes possible to delete old resume data from the nonvolatile memory 104.

Figure 6:
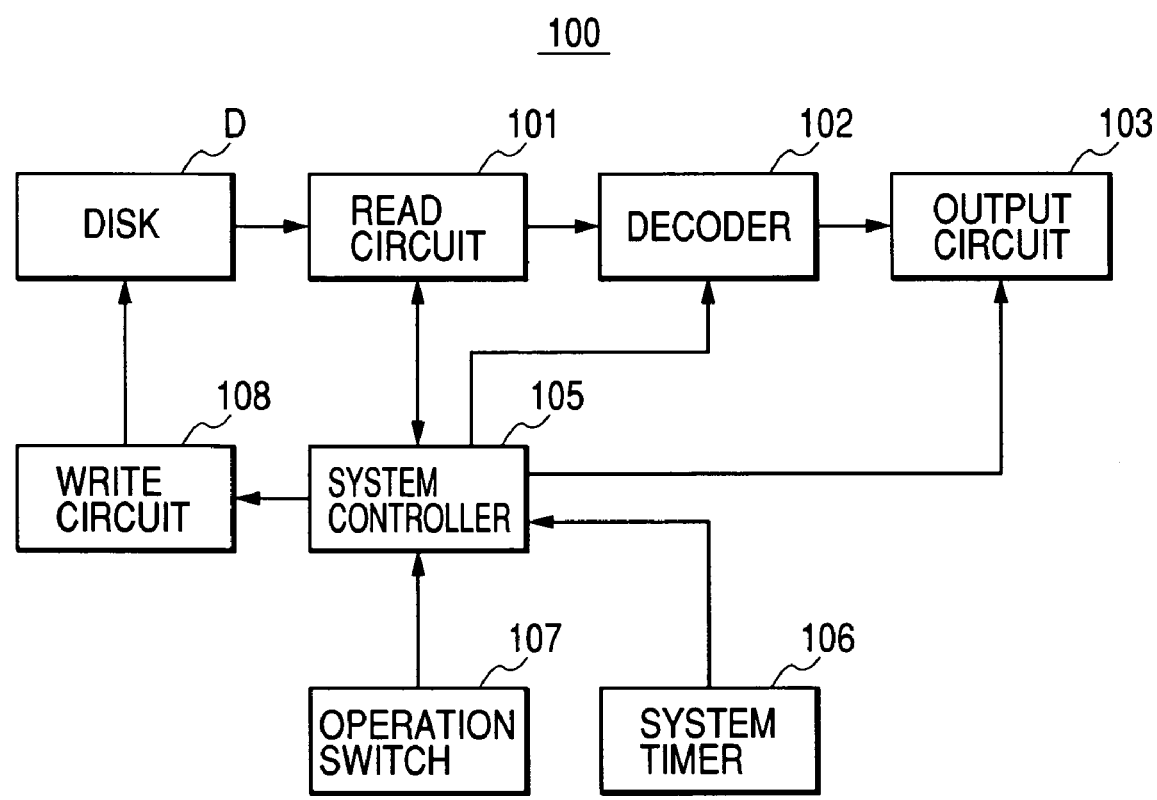
FIG. 6 is a block diagram showing another configuration of the reproducing apparatus of the embodiment of the present invention.

Incidentally, in the embodiment described above, the resume data such as a stop time of a reproduction stop and the stop address thereof is stored in the built-in nonvolatile memory 104, and the resume function is realized by the use of the resume data. However, when the disk D is a medium capable of recording data such as a digital versatile disk-random access memory (DVD-RAM) and a magnetic disk (MD), as shown in FIG. 6, the reproducing apparatus 100 may be configured to be provided with a write circuit 108 for writing data on the disk D, and may record the resume data shown in FIG. 3 on the disk D to read out the resume data from the disk D with the read circuit 101.

Moreover, it is also possible to use a medium such as a memory card containing a semiconductor memory therein in addition to the disk capable of being easily exchanged with a mounting/ejecting mechanism. Furthermore, the reproducing apparatus 100 may include therein a large capacity hard disk having a capacity of the degree of several hundred giga byte.

Moreover, in the embodiment described above, as also shown in FIG. 1, the configuration in which the reproduction start position (resume address) is gradually changed through a plurality of steps (three steps in the embodiment described above) from a stop address is exemplified. As anther embodiment, the reproducing apparatus may be configured to start reproduction just before a stop address before a predetermined time period such as a week, or a month, elapses from a reproduction stop, and to start reproduction from the head position of the contents after the elapse of the predetermined time period.

Moreover, in the embodiment described above, the disk medium is used as the recording medium. However, the present invention can be similarly applied to a reproducing apparatus using a medium for reproducing image data by performing random accessing.

As described above, according to the embodiment of the present invention, a start position of resume reproduction is set at a position before the last reproduction stop position by several seconds to make the connection with an image seen in the past easy to understand. When resume reproduction is performed, a reproducing operation fitted to the memorizing characteristics of an ordinary person can be automatically performed.

Moreover, the resume position from which the next reproduction is to be started is moved forward, as time elapses. Thereby, the contents of a scene which has been reproduced before is made to be easy to be remembered, and to be easy to be confirmed.

Moreover, the resume data preceding the present time by a predetermined time period is deleted, and consequently, the capacity of a memory for holding the resume data can be ensured effectively.

Moreover, it becomes possible to skip to the last stop position to return to an original resume reproduction position by performing a predetermined operation of the user when the user grasps the contents during resume reproduction. Consequently, a highly convenient resume function can be provided.

Moreover, the resume data is managed on the basis of the identification information of contents. Consequently, even if a medium of a dynamic image is changed, a resume address can be set to each contents.

Moreover, it is also possible to use the resume function when a contents which has been reproduced already is again reproduced. In such a case, it is possible to confirm the last scene of the contents, and to perform the skip reproduction described above similarly.

Moreover, in the embodiment described above, the information of the date and time of reproduction stop is recorded as resume data. However, a configuration for recording only the information of date, on which reproduction is stopped, without the information of time may be adopted.

Moreover, the object of the present invention may be achieved by providing a storage medium having a record of a program code of the software realizing the functions of the embodiment described above to the system or the apparatus in order that the computer (or the central processing unit (CPU) or the micro processing unit (MPU)) of the system or of the apparatus may read the program code stored in the storage medium and may execute the read program code.

In this case, the program code, read from the storage medium, itself realizes the functions of the embodiment described above, and the program code itself and the storage medium storing the program code constitute the present invention.

As the storage medium for supplying the program code, for example, a flexible disk, a hard disk, an optical disk, a magneto-optical disk, a compact disk read only memory (CD-ROM), a compact disc recordable (CD-R), a magnetic tape, a nonvolatile memory card, a ROM, and the like can be used.

Moreover, not only the case where the functions of the embodiment described above are realized by the execution of the program code read by the computer is included in the scope of the present invention, but also the case where an operating system (OS), or basic system, or the like, which is working on the computer, executes a part or the whole of the actual processing to realize the functions of the embodiment described above by the processing by the OS or the like is included in the scope of the present invention.

Moreover, the present invention also includes the case where a program code read from the storage medium is written in a memory mounted on a capability expansion board inserted into the computer or on a capability expansion unit connected to the computer before the CPU or the like mounted on the capability expansion board or the capability expansion unit executes a part or the whole of the actual processing and the functions of the embodiment described above are realized by the processing.

Many widely different embodiments of the present invention may be constructed without departing from the spirit and scope of the present invention. It should be understood that the present invention is not limited to the specific embodiments described in the specification, except as defined in the appended claims.

What is claimed is:

1. A reproducing apparatus comprising:
reproducing means for reproducing image data from a recording medium;
determining means for detecting a reproduction stop date when reproduction of the image data is stopped in the past and determining a reproduction start position in the image data on a basis of the reproduction stop date; and
control means for controlling said reproducing means so as to start the reproduction of the image data from the reproduction start position determined by said determining means in response to an instruction of starting reproduction.

2. An apparatus according to claim 1, further comprising:
holding means for holding stop date information indicating the date when the reproduction of the image data is stopped,
wherein said determining means detects the reproduction stop date in the past on a basis of the stop date information held by said holding means.

3. An apparatus according to claim 1, wherein
said determining means sets a head position of the image data as the reproduction start position when time period elapsing from the detected reproduction stop date to the instruction of starting the reproduction exceeds a predetermined time period.

4. An apparatus according to claim 1, wherein
said determining means sets a predetermined position pertaining to a reproduction stop position in the past in the image data as the reproduction start position when a time period elapsing from the detected reproduction stop date to the instruction of starting the reproduction is within a predetermined time period.

5. An apparatus according to claim 4, further comprising:
holding means for holding stop position information indicating the reproduction stop position in the past,
wherein the determining means determines the predetermined position on a basis of the stop position information held by the holding means.

6. An apparatus according to claim 5, wherein
said determining means sets a position the reproduction stop position preceding by a predetermined time as the predetermined position.

7. An apparatus according to claim 1, wherein
said determining means detects a time elapsing from the date when the reproduction of the image data is stopped to a date of the instruction of starting the reproduction, on a basis of the detected reproduction stop date, and sets a position corresponding to the elapsed time as the reproduction start position.

8. An apparatus according to claim 7, wherein
said determining means sets a position nearer to a head of the image data as the reproduction start position, as the elapsed time is longer.

9. An apparatus according to claim 8, wherein
said detecting means includes a timer for clocking a present time, and detects the elapsed time period by means of an output of said timer.

10. An apparatus according to claim 1, wherein
said reproducing means further reproduces stop date information indicating the date when the reproduction of the image data is stopped, from said recording medium, and
said determining means detects the date when the reproduction of the image data is stopped, on a basis of the stop date information reproduced by said reproducing means.

11. A reproducing apparatus comprising:
reproducing means for reproducing image data from a recording medium;
determining means for detecting a reproduction stop date when reproduction of the image data is stopped in the past and a reproduction stop position at a time of the reproduction stop and determining a reproduction start position in the image data on a basis of the reproduction stop date and the reproduction stop position; and
control means for controlling said reproducing means so as to start reproducing of the image data from the reproduction start position determined by said determining means in response to an instruction of starting reproduction.

12. An apparatus according to claim 11, wherein
said determining means detects a time elapsing from the date when the reproduction of the image data has been stopped to a date of the instruction of starting the reproduction, on a basis of the detected reproduction stop date, and sets as the reproduction start position a position preceding the reproduction stop position by a predetermined time period corresponding to the elapsed time.

13. An apparatus according to claim 12, wherein
said determining means sets a position nearer to the reproduction stop position as the reproduction start position, as the elapsed period is shorter.

14. An apparatus according to claim 12, wherein
said determining means sets a position preceding the reproduction stop position by a first predetermined time, as the reproduction start position when the elapsed period is within a first period, and sets a position preceding the reproduction stop position by a second predetermined time longer than the first predetermined time when the elapsed period exceeds the first period within a second period longer than the first period.

15. An apparatus according to claim 12, wherein
said control means further controls said reproducing means so as to start reproduction of the image data from the reproduction stop position in response to an instruction of skipping to the reproduction stop position after said control means starts reproduction of the image data from the reproduction start position determined by said determining means.

16. An apparatus according to claim 11, further comprising:
holding means for holding stop date information indicating the reproduction stop date when the reproduction of the image data is stopped and stop position information indicating the reproduction stop position in the past,
wherein said determining means determines the reproduction start position on a basis of the stop date information and the stop position information, both held by said holding means.

17. An apparatus according to claim 16, wherein
said holding means stores stop date information indicating a date when the reproduction of the image data is stopped lastly, and stop position information indicating a position where the reproduction of the image data is stopped lastly.

18. An apparatus according to claim 16, wherein
said reproducing means reproduces the image data pertaining to a plurality of contents from said recording medium, and
said holding means holds the stop date information and the stop position information every plurality of contents.

19. A reproducing apparatus comprising:
reproducing means for reproducing image data from a recording medium;
reproduction instruction means for instructing a reproduction start of the image data;
stop position detecting means for detecting a stop position of a last reproduction stop of the image data;
reproduction position determining means for selecting any one of a first position corresponding to the stop position detected by said stop position detecting means, a second position corresponding to a head position of the image data, and a third position located between the first position and the second position as a reproduction start position according to a time period elapsing from the last reproduction stop of the image data to an instruction of the reproduction start by said reproduction instruction means; and
control means for controlling said reproducing means so as to reproduce the image data from the reproduction start position selected by said reproduction position determining means in response to the instruction of the reproduction start by said reproduction instruction means.

20. An apparatus according to claim 19, wherein
said reproduction position determining means calculates the third position on a basis of the reproduction stop position detected by said stop position detecting means.

21. A reproducing apparatus for reproducing image data from a recording medium in response to a reproduction start instruction, wherein
wherein said apparatus detects a time period elapsing from a last stop of reproduction of the image data to the reproduction start instruction on a basis of stop date information indicating a date of a last stop of reproduction of the image data, and
wherein said apparatus starts reproduction of the image data from a head of the image data when the elapsed time period exceeds a predetermined time period, and starts the reproduction of the image data from a position immediately before a position of the last stop of the reproduction of the image data when the elapsed time period is shorter than the predetermined time period.

22. An apparatus according to claim 21, wherein
said apparatus reads the stop date information indicating the date of the last stop of the reproduction of the image data from a nonvolatile memory, and detects the elapsed time period on a basis of the stop date information.

23. An apparatus according to claim 21, wherein
said apparatus reproduces the stop date information indicating the date of the last stop of the reproducing of the image data from the recording medium, and detects the elapsed time period on a basis of the stop date information.

24. A reproducing method comprising the steps of:
reproducing image data from a recording medium;
detecting a reproduction stop date when reproduction of the image data is stopped in the past and determining a reproduction start position in the image data on a basis of the reproduction stop date; and
controlling said reproducing step so as to start the reproduction of the image data from the reproduction start position determined in said detecting step in response to an instruction of starting reproduction.

25. A reproducing method comprising the steps of:
reproducing image data from a recording medium;
detecting a reproduction stop date when reproduction of the image data is stopped in the past and a reproduction stop position at a time of the reproduction stop and determining a reproduction start position in the image data on a basis of the reproduction stop date and the reproduction stop position; and
controlling said reproducing step so as to start reproducing of the image data from the reproduction start position determined in said detecting step in response to an instruction of starting reproduction.

26. A reproducing method comprising the steps of:
reproducing image data from a recording medium;
instructing a reproduction start of the image data;
detecting a stop position of a last reproduction stop of the image data;
selecting any one of a first position corresponding to the stop position detected at said detecting step, a second position corresponding to a head position of the image data, and a third position located between the first position and the second position as a reproduction start position according to a time period elapsing from the last reproduction stop of the image data to an instruction of the reproduction start in said instructing step; and controlling said reproducing step so as to reproduce the image data from the reproduction start position selected in said selecting step in response to the instruction of the reproduction start in said instructing step.

27. A reproducing method for reproducing image data from a recording medium in response to a reproduction start instruction, comprising the steps of:

detecting time period elapsing from a last stop of reproduction of the image data to the reproduction start instruction on a basis of stop date information indicating a date of a last stop of reproduction of the image data, and starting reproduction of the image data from a head of the image data when the elapsed time period exceeds a predetermined time period, and starting the reproduction of the image data from a position immediately before a position of the last stop of the reproduction of the image data when the elapsed time period is shorter than the predetermined time period.

* * * * *

UNITED STATES PATENT AND TRADEMARK OFFICE
CERTIFICATE OF CORRECTION

PATENT NO. : 7,184,376 B2
APPLICATION NO. : 10/781740
DATED : February 27, 2007
INVENTOR(S) : Takeuchi It is certified that error appears in the above-identified patent and that said Letters Patent is hereby corrected as shown below:

COLUMN 1:
Line 16, "Such the" should read -- Such an --;
Line 20, "such the" should read -- such an --;
Line 40, "missed to see," should read -- missed, --;
Line 42, "rewind" should read -- recall --;
Line 49, "seen" (second occurrence) should read -- observed --; and
Line 50, "seeing becomes" should read -- sighting fades --.

COLUMN 3:
Line 33, "made to be off," should read -- turned off, --; and
Line 53, "every" should read -- for every --.

COLUMN 4:
Line 5, "waits" should read -- awaits --; and
Line 15, "In case" should read -- In the case --.

COLUMN 5:
Line 42, "two information of" should read -- two items of information: --; and
Line 52, "Steps" should read -- Step --.

COLUMN 7:
Line 67, "time" should read -- a time --.

COLUMN 8:
Line 18, "position" should read -- position pertaining to --;
Line 19, "preceding by" should read -- preceded by --;
Line 22, "a time" should read -- a time period --; and
Line 60, "a time" should read -- a time period --.

COLUMN 9:
Line 45, "every" should read -- for every --.

Signed and Sealed this

Twelfth Day of October, 2010

David J. Kappos
*Director of the United States Patent and Trademark Office*

COLUMN 10:
Line 11, "wherein" should be deleted; and
Line 16, "wherein" should be deleted.